United States Patent

Frost et al.

[11] 3,899,226
[45] Aug. 12, 1975

[54] BEARING ASSEMBLY
[75] Inventors: Ruben E. Frost, Grand Rapids; Douglas J. Van Der Meulen, Martin, both of Mich.
[73] Assignee: C. L. Frost & Son, Inc., Grand Rapids, Mich.
[22] Filed: May 29, 1973
[21] Appl. No.: 364,889

[52] U.S. Cl. .............................. 308/187.1; 308/36.1
[51] Int. Cl. ................................................ F16c 1/24
[58] Field of Search ..... 308/187.1, 187, 36.1, 187.2

[56] References Cited
UNITED STATES PATENTS
| | | | |
|---|---|---|---|
| 1,722,488 | 7/1929 | Bolt et al. | 308/187.2 |
| 3,108,839 | 10/1963 | Johnson | 308/187 |
| 3,602,150 | 8/1971 | Frost | 308/187 |

FOREIGN PATENTS OR APPLICATIONS
| | | | |
|---|---|---|---|
| 1,057,778 | 11/1953 | France | 308/187 |

*Primary Examiner*—M. Henson Wood, Jr.
*Assistant Examiner*—Richard A. Bertsch
*Attorney, Agent, or Firm*—Price, Heneveld, Huizenga & Cooper

[57] ABSTRACT

This disclosure relates to a seal structure and adapter for lubricating a bearing assembly in which roller bearings are sealed between an outer and inner race. The seal structure has outer and inner seal rings the outer ring being fixed to the inner race and the inner ring being fixed to the outer race each having axial ring portions which extend axially outwardly. The adapter is mounted through an opening in the outer ring and has a restricted passageway therethrough to permit injection of lubricating fluids directly into the bearing assembly through the seal structure.

15 Claims, 7 Drawing Figures

PATENTED AUG 12 1975　　　　　　　　　　　　　　　　　　3,899,226
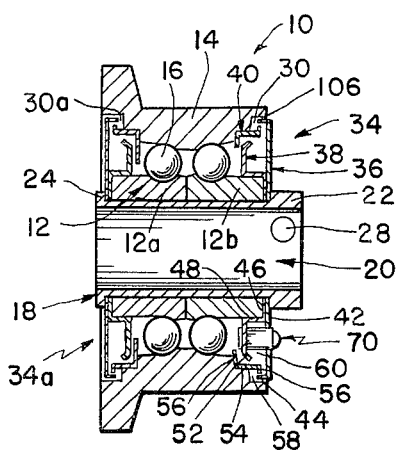
FIG 2
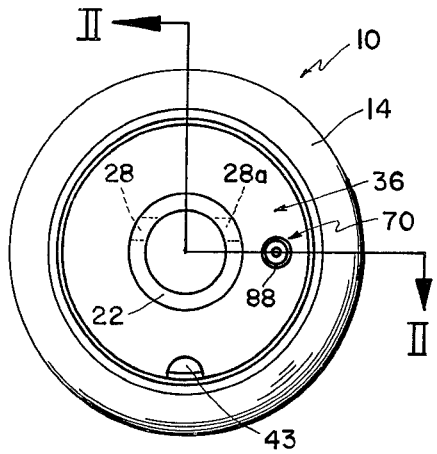
FIG 1
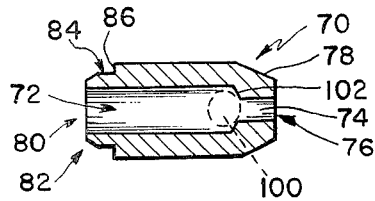
FIG 3
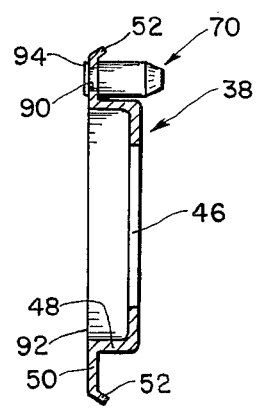
FIG 4
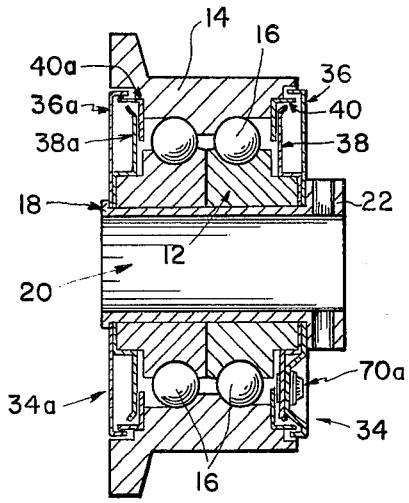
FI
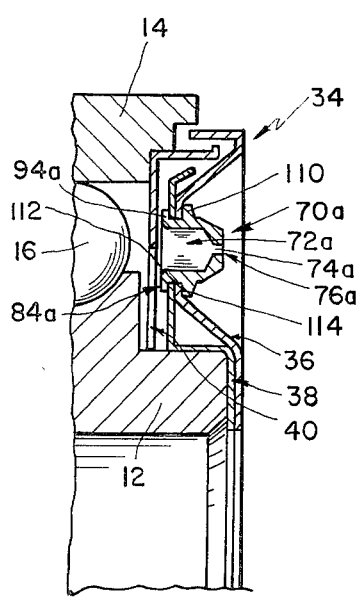
FIG 7
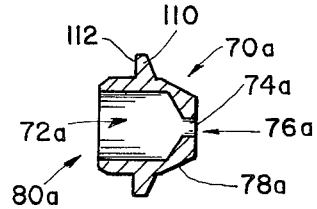
FIG 6

BEARING ASSEMBLY

BACKGROUND OF THE INVENTION

This invention relates to bearing assemblies utilized in environments wherein the bearing assembly is exposed to substantial dirt, dust, fluids or even totally immersed therein.

Carriages having roller bearings are used for conveyor systems in many industrial manufacturing operations. Frequently, the conveyors must carry parts through areas of very high moisture content such as spray baths in which water sprays come in contact with the parts and the conveyors. Other applications actually immerse the conveyor in fluids while other applications may call for burying installations operable in dirt, gravel or other types of solid particles. High moisture areas and particularly water sprays are quite hard on the bearing structures as the moisture or water penetrates the seals and causes detoriation of the bearings. Likewise, soil, dirt and grime have an equally adverse effect.

Most bearing structures are intended to seal dirt out and grease in. Well known labyrinth seals are quite efficient for this purpose. However, these seals do not keep the water out of the bearings. As the race members rotate relative to each other, the water can go from one radial land to the other until it reaches the central area of the bearings. A particularly unique seal has been developed which provides a pair of troughs to catch water, moisture or fine particles and a drain hole to permit release of the collections from the troughs. This invention is disclosed and described in U.S. letters Pat. No. 3,537,725 issued to R. E. Frost and commonly assigned to the same assignee herein.

While many advantages and benefits have been gained by utilizing the sealing structure of the above identified patent, the problem of efficient and economical lubrication and relubrication of bearing assemblies remains. Conventionally, the bearing structures include a plurality of roller bearings sealed between an outer and inner race. Lubricating fluids such as oil or grease have been injected into this area through an axial passageway formed in the shaft utilizing the bearing, the axial passageway terminating into a radial passageway which then opens into the circumferential trough formed between the inner and outer race. The grease in this case travels a substantial distance and eventually some blockage of this passageway is developed through hardening of the grease in areas where build up is facilitated by directional changes in the flow passageway. Thus, there is a need in this art for an improved arrangement for effectively and efficiently lubricating the bearing system assembly as well as relubricating same.

SUMMARY OF THE INVENTION

In accordance with the invention, a roller bearing assembly includes a plurality of roller bearings intermediate an outer and inner race. The bearings are sealed by and outer an inner radial sealing ring spaced axially from each other, each being fixed to opposite races and having portions extending to or in close proximity to the opposite race. The rings form at least one annular trough for collecting moisture or small particles. A lubrication injection adapter having a lubricating passageway formed axially therethrough is positioned directly through and inner the outer and inner sealing ring and anchored thereto whereby lubricating fluid is introduced directly through the adapter into the bearing intermediate the outer and inner race.

In one embodiment of the invention, the adapter is anchored to an intermediate sealing ring mounted to the same race as the outer ring. The adapter includes a reduced cross-sectional nose portion which forms a shoulder for abutment of the adapter up against the inner sealing ring. The portion inwardly from the shoulder is deformed about the opposite side of the intermediate sealing ring to positively secure the adapter to the intermediate ring.

In an alternative embodiment, the outer ring is deformed at a locus into engagement with the intermediate ring and the adapter includes a flange which abuts the outer ring, the nose being deformed against the intermediate ring to clamp the rings therebetween.

The injection of lubricating fluid directly into the bearings through the seal greatly facilitates efficient and positive lubrication of the entire circumferential trough formed intermediate the two races. Multidirectional passageways are eliminated thereby eliminating any potential for the build up or collection and eventual hardening of the lubrication fluid resulting in passageway blockage. Also, the utilization of a single adapter through one side of the roller bearing structure is sufficient to completely purge the entire bearing structure with lubricating fluid. This is extremely beneficial in those bearing assemblies where it is difficult to gain access from both sides of the roller bearings. Finally, the direct injection of lubricating fluid into the bearing through the seal eliminates costly machining of multi-directional passageways and therefore on a mass production basis, provides significant economical advantages.

DESCRIPTION OF THE DRAWINGS

FIG. 1 is a side elevation view of a roller bearing assembly having a seal and lubrication injector according to the invention;

FIG. 2 is a cross-sectional view of the roller bearing assembly taken along line 2—2 of FIG. 1;

FIG. 3 is a cross-sectional view of the lubrication injection adapter according to the invention;

FIG. 4 is a cross-sectional view of one of the sealing rings utilized in the invention with the adapter anchored thereto;

FIG. 5 is a view similar to FIG. 2 showing a modification of the invention;

FIG. 6 is a view similar to FIG. 3 illustrating an alternative injection adapter; and FIG. 7 is an enlarged fragmentary view in cross section of the adapter illustrated in FIG. 5.

DESCRIPTION OF THE PREFERRED EMBODIMENTS

Referring now to the drawings in detail, and particularly to FIGS. 1 and 2, a roller bearing assembly 10 is illustrated having an inner race 12, an outer race 14 and bearings 16 therebetween. The inner race 12 is in two parts 12a, 12b, and fits about a hub 18 which has an annular recess 20 extending substantially the axial length thereof forming spaced annular shoulders 22 and 24 in which the inner race 12 and sealing rings described hereinafter are indexed. The hub opening 26 receives a shaft or the like which is anchored thereto by a cotter pin (not shown) or the like which fits through aligned openings 28, 28a in the wall of hub 18.

The outer race 14 has an annular counterbore 30 at one axial end and a second annular counterbore 30a at the opposite axial end.

In the preferred embodiment illustrated, each end of the bearing is sealed by a seal 34 and 34a. Each of these seals comprises an outer sealing ring 36 and 36a; intermediate sealing rings 38 and 38a; and an inner sealing ring 40 and 40a. Both sealing rings 38, 38a and 40, 40a are inner relative rings 36, 36a. In the following description, only seal 34 will be described in detail. Seal 34a is however identical thereto except where noted and appropriate reference numerals with the suffix a are applied to the drawings.

The outer sealing ring 36 has a radially extending flange 42 by which it is fixed to inner race 12 and hub 18. An axial annular flange 44 extends axially inwardly from the outer radial end of radial flange 42 in close proximity to outer race 14. A drain hole 43 (FIG. 1) is provided in the bottom of radial annular flange 42 for a purpose which will be described hereinafter.

The intermediate sealing ring 38 has a radial attaching flange 46 by which sealing ring 38 is affixed to the inner race 12 and hub 18. Each radial flange portion 42 and 46 are held tightly in abutment with each other and shoulder portion 24 of hub 18 and the end wall portion of inner race 12. An axial cylindrical portion 48 extends inwardly from the radial attaching flange portion 46 and joins a radially outwardly extending portion 50 with an axially outwardly turned lip 52.

The inner sealing ring 40 has an axial ring portion 54 by which sealing ring 40 is fixed to the outer race 14. A radially inwardly extending portion 56 depends from the inner portion of axial ring portion 54 and is spaced axially inwardly of the radially outwardly extending portion 50 of the intermediate sealing rings 40. A radially outwardly extending lip 56 extends from the axial outer end of ring portion 40. The combination of the annular recess 30 with the axial ring portion 40 and radially outwardly extending lip portion 56 forms a trough 58 for the collection of water or particles which pass around the edge of the outer sealing rings 36, 36a. Water which collects in trough 54 can be discharged from the seal area through drain opening 43 as the outer race 14 rotates about the inner race 12. The combination of the radial annular flange 50, the axial cylindrical portion 48 of the intermediate sealing rings 38 and the radial annular flange portions 56 of the outer sealing rings 40 forms a second trough 60 within the seal area. The second trough collects water and dirt which pass over the radially outwardly extending lip 56 of inner sealing ring 40. Accumulations of water and dirt will tend to flow around to the bottom of this trough and out drain hole 43. The axially outwardly extending lip 52 on the radially outwardly extending portions 50 tends to force the water towards drain hole 43 as it runs downwardly within the trough. In the preferred embodiment it is noted that the free end of each sealing ring does not engage the opposite race which is moving relative thereto. If necessary engagement could be provided by bonding a non-metallic extension or coating such as rubber or plastic which through constant engagement with the moving race will not deteriorate appreciably. An example of this is set forth in U.S. Letters Pat. No. 3,537,725, referred to above.

Lubrication fluids are injected into the bearing itself intermediate inner and outer races 12 and 14 by an adapter 70 illustrated in FIGS. 1–4. Referring more specifically to FIGS. 3 and 4, adapter 70 has a general cylindrical configuration with a passageway 72 extending axially therethrough, the latter having a restricted end portion 74 of reduced cross section relative the remaining portion of passageway 72. Restricted portion 74 defines an inlet opening 76, the inlet portion having a taper 78 to facilitate receipt of a lubrication fitting or the like (not shown) for injecting lubrication fluid through inlet opening 76, through passageway 72 out outlet opening 80. The outlet end 82 of adapter 70 has a reduced outer cross section forming an annular groove 84, forming a shoulder 86.

Referring briefly back to FIGS. 1 and 2, an opening 88 is formed in the radial portion 50 of outer sealing ring 36. Opening 88 preferably has a diameter slightly greater than the diameter of adapter 70. This permits facile insertion of adapter 70 through outer sealing ring 36.

Referring to FIGS. 2 and 4, the intermediate sealing ring 38 also includes an opening 90 having a diameter approximately equal to but slightly larger than the reduced portion 84 of adapter 70. This permits insertion of adapter 70 through opening 88 in outer sealing ring 36 and through opening 90 of sealing ring 38 until shoulder 86 comes into abutment with the outer surface portion of the radial sealing portion 50 of sealing ring 36. This will index adapter 70 relative both sealing rings.

Referring to FIG. 4, adapter 70 is preferably anchored to sealing ring 38 prior to its insertion in the bearing assembly as illustrated in FIG. 1. Preferably, the portion of outer end 84 which extends beyond the inner surface 92 of sealing ring 38 is deformed forming a sealing flange or lip 94 to positively anchor adapter 70 to sealing ring 38. Referring to FIG. 2, it should be noted that the radial sealing portion 56 of inner sealing ring 40 is not long enough to project into interference with the outlet 80 of passageway 72 (FIG. 3). In this regard, the corresponding portion 56a of inner sealing portion 40a is slightly larger.

The application of lubricating fluid initially or as a relubrication step in light of the foregoing should be obvious. After the bearing is assembled, an appropriate source of lubricating fluid such as grease is injected into the bearing through adapter 70 by proper application of a hose or the like to the inlet end 74 of adapter 70. The entire bearing trough between the inner and outer race is lubricated through a single adapter. The application of the fluid pressure on the grease will cause it to flow freely about the various roller elements such as roller bearings 16 spreading completely about the circumferential trough between the inner and outer races 12 and 14. Complete purging of the bearing with the lubricant will be evident to the attendant applying the lubrication by the presence of lubricating fluid flowing out of the sealing member 34a.

As mentioned previously, one of the intended uses of the bearing assembly of the invention is in an environment wherein the bearing is exposed to moisture to the extent that it may be completely immersed therein or exposed to soil and dirt by being buried therein. In certain applications, for example total immersion into water or other fluids, it may be desirable to provide a check valve means in adapter 70 in the form of a ball check 100 shown in phantom in FIG. 3. The transition between the enlarged portion of passageway 72 and the restricted portion 74 can be machined in the form of a valve seat 102 in which check valve 100 seats. An appropriate biasing mechanism well known to those skilled in the art may be utilized to urge check valve 100 into a seated or closed position as illustrated in FIG. 3. It should also be appreciated that the restricted cross-sectional opening of restricted passageway portion 74 is extremely small compared to the exposed surface area of sealing portion 36 and in fact the circumferential spacing 106 (FIG. 2) between axial seal portion 44 of sealing ring 36 and the wall of outer race 14. Thus the slight potential for insertion of dirt or moisture into the bearing through adapter 70 is small enough to be neglected as a problem area. Should this become of interest however, a ball check valve 100 such as that shown in phantom in FIG. 3 could be utilized.

Reference is now made to FIGS. 5–7 which illustrate an alternative embodiment of the invention. In this modification, like numerals have been used to describe like parts. In the modification of FIGS. 5–7, the seal assemblies 34 and 34a are exactly the same as in the embodiment of FIGS. 1–4. The principal distinction in the embodiment of FIGS. 5–7 is the modified lubrication injector adapter 70a and the particular way in which it is positioned with regard to seal assembly 34.

Referring to FIG. 6, adapter 70a, similar to adapter 70 illustrated in FIG. 3 has a flow passageway 72a, and a necked down or restricted inlet passageway 74a. The inlet portion likewise has a tapered outer wall 78a to accommodate a fitting or the like for injection of lubricating fluid into inlet 74a and the attendant inlet orifice 76a. The outer circumference of adapter 70a is however constant and does not include the annular reduced cross-sectional portion 84 but rather includes an annular flange 110 forming an annular shoulder 112 which when the adapter is inserted in seal 34 abuts against the outer face of sealing ring 36 as illustrated clearly in FIG. 7. Aligned openings 112 and 114 are provided in sealing rings 36 and 38 having identical cross sections slightly larger than the diameter of adapter 70a so that adapter 70a can be inserted therethrough up to the shoulder 110. It should be noted that the axial length of adapter 70a is substantially reduced from the alternative adapter 70 and hence the portion downstream from shoulder 110 would be insufficient in length if sealing rings 36 and 38 were maintained at their normal axial separation.

Sealing ring 36 however is dimpled at the locus of opening 114 so that the portions of sealing ring 36 at openings 112 and 114 is brought into abutment with sealing ring 38. Adapter 70a is then inserted through openings 112 and 114 and the outlet portion 84a is deformed to form an annular shoulder 94a spaced from shoulder 110 clamping sealing rings 36 and 38 together.

Although but two embodiments have been shown and described in detail, it will be obvious to those having ordinary skill in this art that the details of construction of these particular embodiments may be modified in a great many ways without departing from the unique concepts presented. It is therefore intended that the invention is limited only by the scope of the appended claims rather than by particular details of construction shown, except as specifically stated in the claims.

The embodiments of the invention in which an exclusive property or privilege is claimed are defined as follows:

1. A roller bearing assembly comprising, in combination: an inner and outer race; bearing means between said races; sealing means to retain lubrication at said bearing means, said sealing means having an outer sealing ring fixed to one of said races, said outer sealing ring having a radial edge thereof extending to or in close proximity to the other of said races, an inner sealing ring fixed to said other race and having a radial edge thereof extending toward said one race, said radially extending portions of said sealing rings being spaced axially from each other said sealing rings forming at least one trough for collecting particles or the like and drain means to drain such particles or the like from said trough; and lubricating injection means comprising an adapter having a lubricating passageway formed axially therethrough, said adapter being positioned axially through said outer sealing ring whereby lubricating fluid is introduced through said adapter directly into said bearing means intermediate said outer and inner race through said axial sealing means.

2. The roller bearing assembly according to claim 1 wherein said outer sealing ring includes means defining an opening, said adapter being generally cylindrical and positioned through said opening having an inlet portion externally of said outer ring and an outlet portion internally of said outer ring, said outlet portion having a reduced outer diameter forming a shoulder abutting the exterior surface of said outer ring to index said adapter relative said sealing rings.

3. The roller bearing assembly according to claim 2 wherein said outlet portion is partially deformed to form an annular flange firmly abutting the interior surface of said outer ring to anchor said adapter to said inner ring.

4. The roller bearing assembly according to claim 1 wherein said sealing means further includes an intermediate sealing ring fixed to said one of said races and axially spaced intermediate said inner and outer sealing rings, said outer ring and intermediate ring having means defining axially aligned openings, said adapter being generally cylindrical and positioned through said openings, said adapter having an annular flange forming an annular shoulder abutting said outer sealing ring when said adapter is positioned through said openings to index said adapter relative said rings.

5. The roller bearing assembly according to claim 4 wherein one of said intermediate and outer sealing rings is deformed at the locus of said opening of said one ring whereby said intermediate and outer rings abut at the locus of said openings, the portion of said adapter projecting inwardly beyond said inner ring being deformed to form an annular flange firmly abutting the interior surface of said intermediate ring to anchor said adapter and rings together.

6. The roller bearing assembly according to claim 5 wherein said outer ring is deformed at the locus of said outer ring opening to bring said outer ring locus into abutment with said inner ring.

7. The roller bearing assembly according to claim 1 wherein said adapter includes an inlet portion and outlet portion, the inlet portion having a restricted passageway relative the outlet portion.

8. The roller bearing assembly according to claim 7 wherein the transition between said restricted passageway portion and the remainder thereof defines a valve seat for receipt of a ball check valve.

9. A roller bearing assembly comprising, in combination: an inner and outer race; bearing means between said races; axial sealing means to retain lubrication at said bearing means, said sealing means having an outer sealing ring fixed to one of said races, said outer sealing ring having a radial edge thereof extending to or in close proximity to the other of said races, an inner sealing ring fixed to said other race and having a radial edge thereof extending toward said one race, said sealing rings being spaced from each other; said axial sealing means further including an intermediate sealing ring fixed to said one of said races and axially spaced intermediate said inner and outer sealing rings, said outer ring and intermediate ring having means defining axially aligned openings and lubricating injection means comprising an adapter having a lubricating passageway formed axially therethrough, said adapter being positioned axially through said openings whereby lubricating fluid is introduced through said adapter directly into said bearing means intermediate said outer and inner race through said axial sealing means, said adapter being anchored to at least one of said outer and intermediate rings.

10. The combination according to claim 9 wherein said adapter includes a shoulder formed circumferentially on the outer surface of said adapter, said shoulder abutting one of said outer and intermediate rings to index said adapter relative said rings.

11. The combination according to claim 10 wherein said adapter includes an inlet and outlet portion, said outlet portion being partially deformed to form an annular flange clamping at least one of said outer and intermediate sealing rings between said flange and shoulder.

12. The roller bearing assembly according to claim 9 wherein said adapter is generally cylindrical having an inlet portion externally of said outer ring and an outlet portion internally of said intermediate ring, said outlet portion having a reduced outer diameter forming a shoulder abutting the exterior surface of said outer ring to index said adapter relative said sealing rings.

13. The roller bearing assembly according to claim 12 wherein said outlet portion is partially deformed to form an annular flange firmly abutting the interior surface of said outer ring to anchor said adapter to said outer ring.

14. The roller bearing assembly according to claim 9 wherein one of said intermediate and outer sealing rings is deformed at the locus of said openings of said one ring whereby said intermediate and outer rings abut at the locus of said openings, the portion of said adapter projecting inwardly beyond said intermediate ring being deformed to form an annular flange firmly abutting the interior surface of said intermediate ring to anchor said adapter and rings together.

15. The roller bearing assembly according to claim 14 wherein said outer sealing ring is deformed at the locus of said outer ring opening to bring said outer ring locus into abutment with said inner ring.

* * * * *

UNITED STATES PATENT OFFICE
CERTIFICATE OF CORRECTION

PATENT NO. : 3,899,226
DATED : August 12, 1975
INVENTOR(S) : Ruben E. Frost et al It is certified that error appears in the above-identified patent and that said Letters Patent are hereby corrected as shown below:

Column 1, line 67; After "through" omit "and inner";

Column 1, line 67; After "outer" omit "and inner";

Column 6, line 37; "inner" should be --- outer ---;

Column 6, line 59; After "outer" insert --- sealing ---;

Signed and Sealed this sixth Day of January 1976

[SEAL]

Attest:

RUTH C. MASON
Attesting Officer

C. MARSHALL DANN
Commissioner of Patents and Trademarks